United States Patent [19]

Hettinga

[11] Patent Number: 4,743,323
[45] Date of Patent: May 10, 1988

[54] METHOD OF MOLDING A COMPOSITE ARTICLE

[76] Inventor: Siebolt Hettinga, 2123 NW. 111th St., Des Moines, Iowa 50322

[21] Appl. No.: 926,723

[22] Filed: Nov. 4, 1986

[51] Int. Cl.⁴ .............................................. B29C 45/14
[52] U.S. Cl. .................................... 156/160; 156/163; 156/229; 156/245; 156/494; 156/500; 264/328.1
[58] Field of Search ............... 156/160, 163, 229, 245, 156/494, 500, 244.11, 244.25; 264/321, 324, 325, 328.1, DIG. 57, 45.1, 46.4, 46.8, 328.2, DIG. 67, DIG. 73; 209/403, 405; 140/108, 109

[56] References Cited

U.S. PATENT DOCUMENTS

| | | | |
|---|---|---|---|
| 3,214,314 | 10/1965 | Rowbottam | 156/160 |
| 3,915,775 | 10/1975 | Davis | 156/494 |
| 3,932,252 | 1/1976 | Woods | 156/245 |
| 4,149,919 | 4/1979 | Lea et al. | 156/245 |
| 4,174,245 | 11/1979 | Martineau | 156/245 |
| 4,568,455 | 2/1986 | Huber et al. | 156/160 |

FOREIGN PATENT DOCUMENTS 0089944  6/1982  Japan ................................. 264/328.1

Primary Examiner—Caleb Weston
Attorney, Agent, or Firm—Rudolph L. Lowell

[57] ABSTRACT

The method of this invention provides for the molding of a composite article such as a woven seat for use in furniture or automobiles wherein a woven fabric material and a plastic frame structure coact to enhance their respective strength characteristics. The fabric material is maintained under tension during the molding operation concurrently with the perimetral portion thereof being imbedded in a bonded relation with the frame structure. The strength characteristics of the woven fabric material are thus increased due to the uniform load distribution over the total area of the fabric seat resulting from the bonded securement of the perimetral portion with the frame structure.

10 Claims, 3 Drawing Sheets

METHOD OF MOLDING A COMPOSITE ARTICLE

BACKGROUND OF THE INVENTION

This invention relates generally to the manufacture of a composite fabric and plastic article and more particularly to a method for molding the perimetral portion of a stretchable fabric material in a total bonded relation with a continuous plastic frame structure so that the fabric material, under tension, extends across a central opening defined by the continuous frame structure.

In the past, in the manufacture of woven seat constructions for use in furniture or in automobiles, the woven material was supported across an open continuous frame structure with the perimetral portion of the woven material secured to the frame structure at spaced positions by staples, sewing, or the like. The tension in the woven material was thus maintained only by the stapled or sewed strands of the woven material. Under load application, therefore, these strands soon became weakened and broke or were torn loose from the staples or sewing. The seat construction thus had a relatively short service life with a lack of firmness and feel for its intended purpose.

Foam molded seats, as disclosed in U.S. Pat. No. 3,932,252, although generally satisfactory, require a breathable fabric covering that is not penetrated by the foam rubber. Where the foam rubber tends to pass through the pores of the fabric, the seat has a tendency to lose its feel, appearance, and firmness because of improper ventilation.

These objections in prior art seat constructions are eliminated by the method of the present invention.

SUMMARY OF THE INVENTION

The method of the invention provides a woven seat construction which can be economically manufactured to provide resilient seating comfort over a long service life. The woven fabric material, while under tension in the mold, has a perimetral portion thereof imbedded within the injected plastic to reinforce the molded frame structure concurrently with maintaining the fabric material under tension extended in a plane common to one side of the frame structure. All strands of the woven fabric material are positively secured by bonded securement to the frame structure so that the load applied on the fabric material is uniformly distributed over the total area of the fabric seat. Seat flexibility and feel are thus maintained over a long service life. A pad and fabric covering therefor can be assembled with the fabric seat construction during the molding operation such that the breathing of the pad takes place through the woven fabric material.

DESCRIPTION OF THE INVENTION

Figure 1:
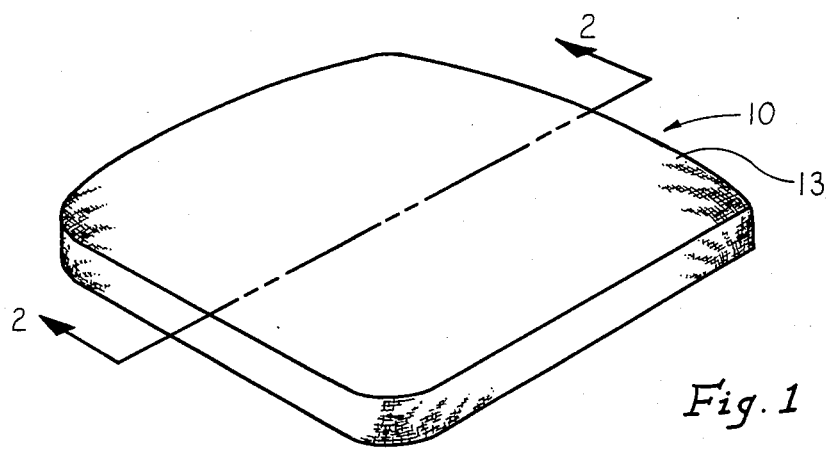
FIG. 1 is a plan perspective view of a seat unit for an automobile made in accordance with the method of this invention.
Figure 2:
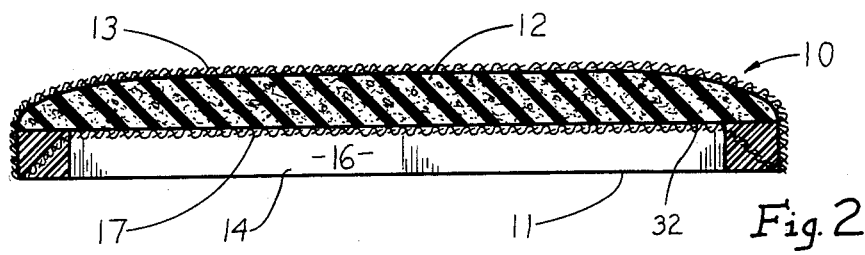
FIG. 2 is an enlarged sectional view taken on line 2—2 in FIG. 1.

With reference to the drawings, there is shown in FIGS. 1 and 2, a seat unit 10 illustrated as adapted for automotive use and including a base structure 11 for supporting a pad member 12 which is covered by a decorative fabric 13.

Figure 3:
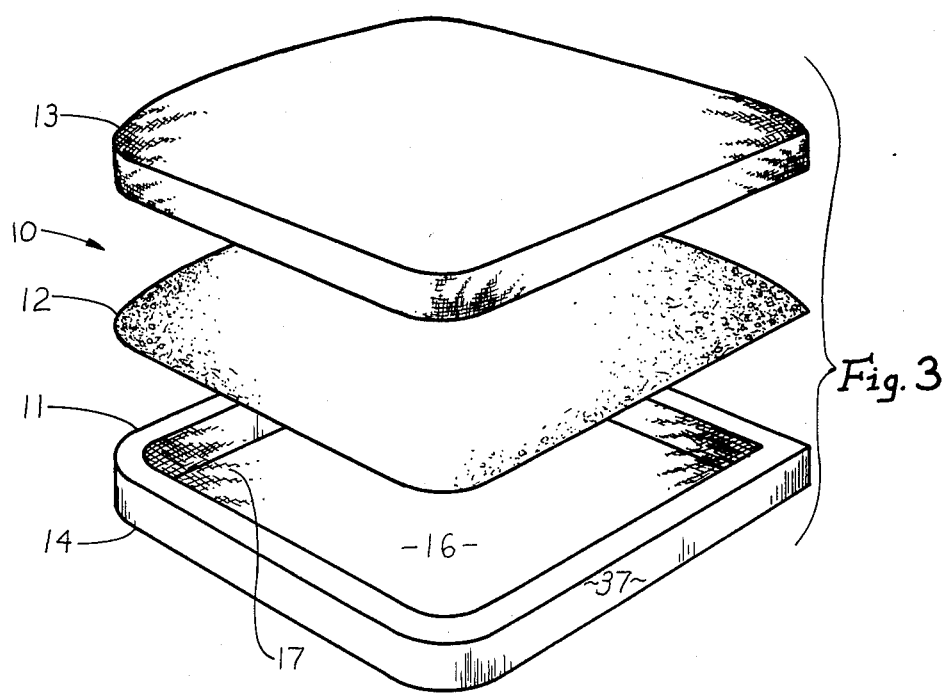
FIG. 3 is an exploded perspective view of the seat unit in FIG. 1.

The base structure 11 (FIGS. 2 and 3) is of an integral construction and comprises a continuous plastic frame structure 14 that defines an open central area 16 corresponding substantially in size to the overall seating area of the seat unit 10. A stretchable woven fabric material 17 is secured about its perimeter in a bonded relation with the plastic frame structure 14 so as to be in a plane common to the upper surface of the frame structure 14.

Figure 4:
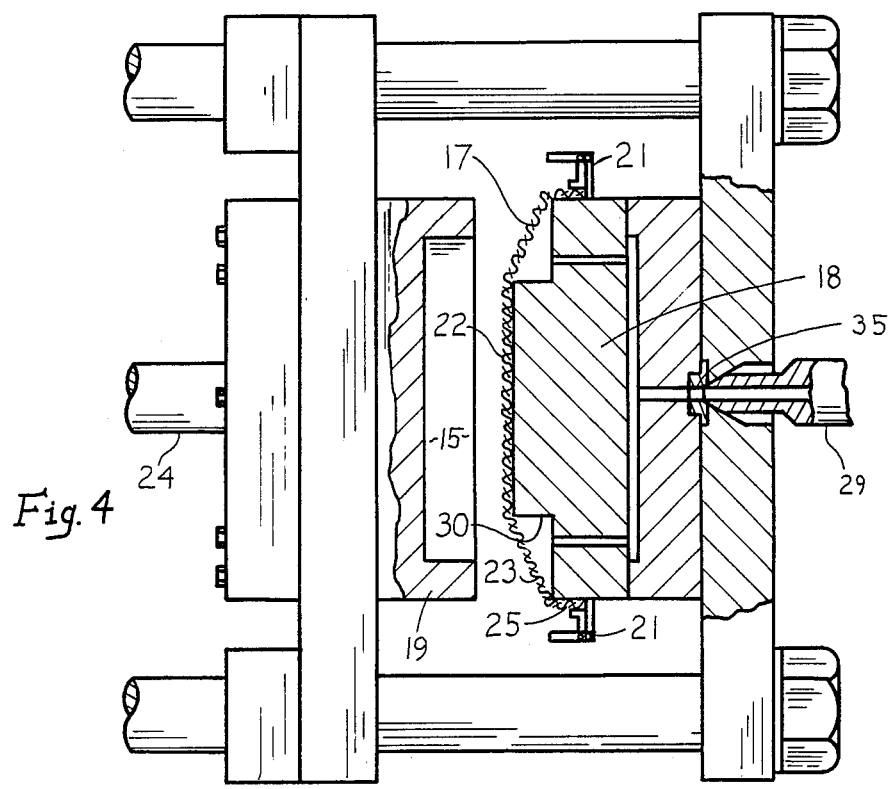
FIG. 4 shows a mold unit for forming the resilient seat structure of the seat unit in FIG. 1, with the mold unit shown in the open position therefor.
Figure 5:
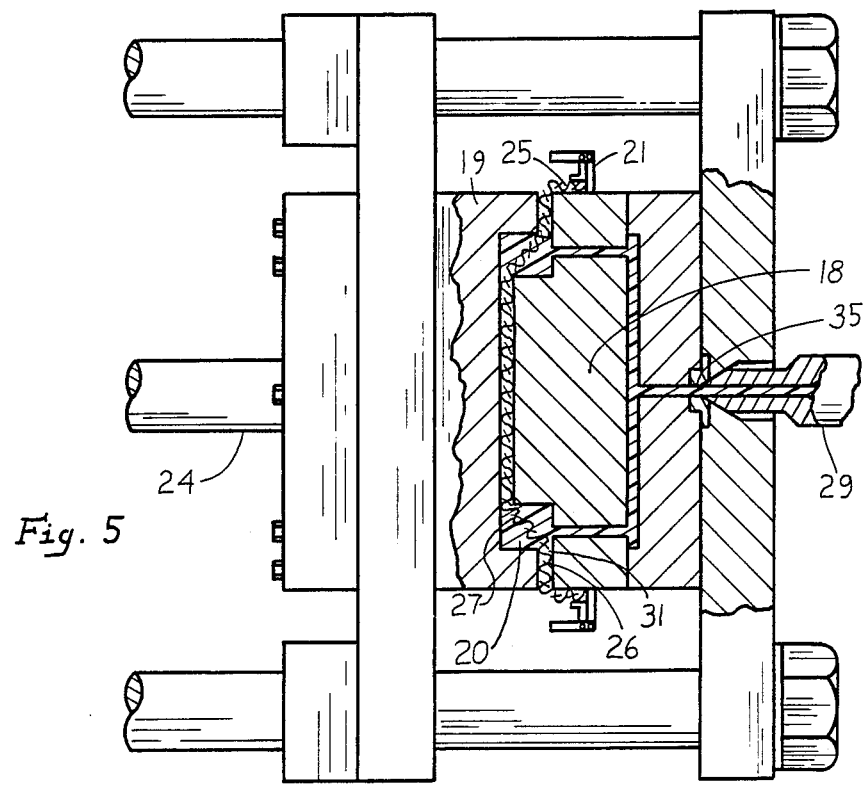
FIG. 5 is illustrated similarly to FIG. 4 and shows the mold unit in a closed position therefor.

In the molding of the base structure 11 (FIGS. 4 and 5) there is provided a mold unit having the stationary male mold 18 and a movable female mold 19 which in their closed positions, shown in FIG. 5, form a mold cavity 20 for the frame structure or member 14. With the molds 18 and 19 in their open positions in FIG. 4, the fabric material 17, shown exaggerated for clarity, is placed across the open side of the male mold 18 with its outer edges 25 secured to the outside of the mold 18 by a suitable clamping means indicated at 21. When thus secured to the mold 18, the fabric 17 has a central portion 22 positioned against a projected central portion 30 of the male mold 18 such than an outer peripheral inclined section 23 extends from such central portion to the clamping means 21.

This arrangement of the fabric 17 with the male mold 18 places the fabric under an initial tension. On movement of the female mold 19 toward the male mold 18 by a ram, shown at 24, into a closed position wherein the projected portion 30 is received within a coacting recess 15 formed in the female mold 19 (FIG. 5) the inclined fabric section 23 is engaged by the female mold 19 inwardly of the clamping means 21 and moved to a final position wherein a first outer peripheral portion 26 of the fabric is clamped between the closed molds 18 and 19 and a second inner peripheral portion 27 of the peripheral section 23 is inclined diagonally transversely across the mold cavity 20 for the frame member 14.

A plastic material is then injected into the cavity 20 through a gate opening from an injection nozzle 29 to fill the cavity 20 concurrently with imbedding the peripheral portion 27 of the fabric within the injected plastic. On removal from the mold, the fabric 17 is trimmed at the junction 31 of the perimetral portions 26 and 27.

By virtue of the engagement of the perimetral section 23 of the fabric 17 by the female mold 19 in its movement toward the male mold 18 and the continuing of such engagement to the final closed position of the molds 18 and 19, tension in the fabric is increased uniformly to a final tension over the total area thereof extended across the central opening 16 of the frame structure 14. As shown in FIG. 2, the fabric 17 under such final tension lies in a plane common to the plane of the upper surface 32 of the frame member 14.

The base structure 11 comprised of the assembly of the fabric 17 and frame member 14 thus constitutes an integral unit which can be used alone to form a seat for an auto or for an article of furniture such as a chair or rocker. When used as an article of furniture a basket weave or woven rope type material may be used in place of the fabric material 17 to provide a desired furniture decor. As a result of the rigid bonded securement of the fabric material 17 with the frame member 14, all strands of the fabric 17 are subjected to the load applied thereon so that such load is uniformly distributed over all portions of the fabric within the central frame opening 16. Any severe load application to only certain of the strands of the fabric material, as occurs when staples or sewing are used to attach the fabric material to its supporting frame structure, is completely eliminated.

Figure 6:
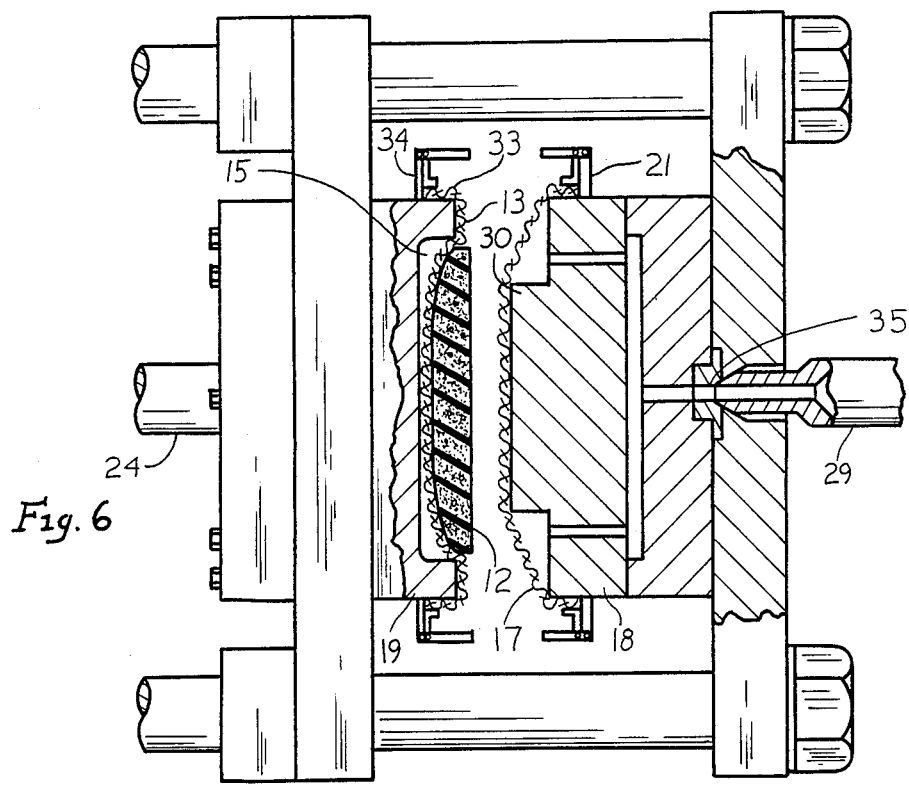
FIG. 6 shows the mold unit for forming the complete padded seat in FIG. 1 with the mold unit shown in the open position therefor.
Figure 7:
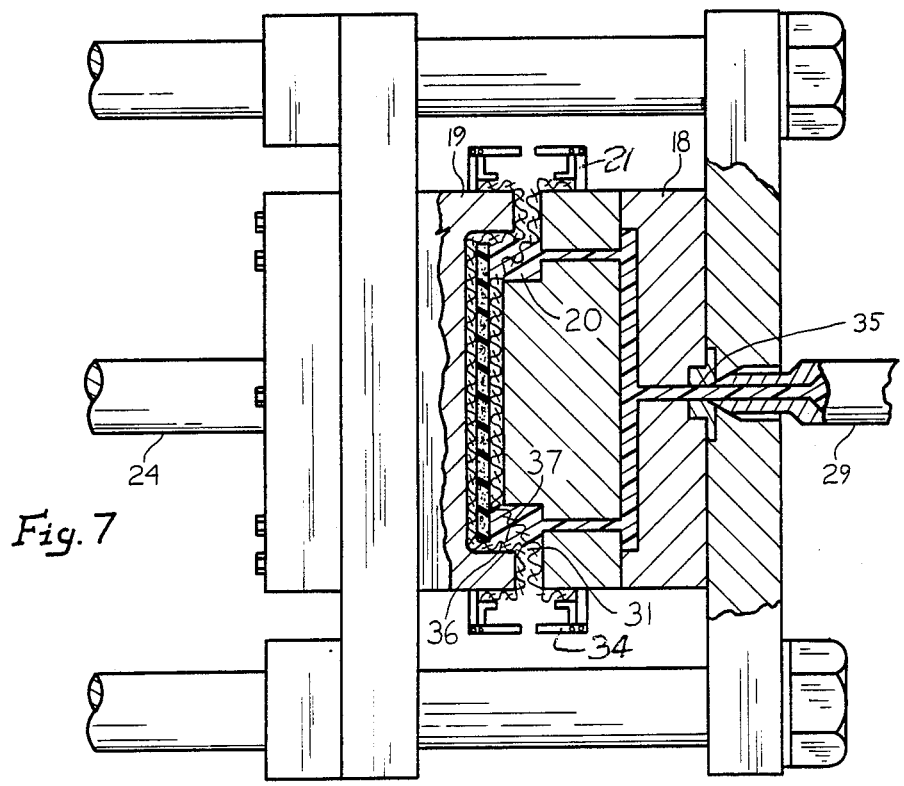
FIG. 7 is illustrated similarly to FIG. 6 and shows the mold unit in the closed position therefor.

When the base structure 11 is to be used with the resilient pad 12 and the fabric cover 13, they may be assembled with the base structure 11 during the molding operation. Thus, as shown in FIG. 6, the fabric cover 13, which is shown of exaggerated thickness, is layed within the female mold 19 with its perimetral section 33 secured to the outside of the mold 19 by a clamping means 34. The pad 12 is then positioned within the female mold 19 in a back to back relation with the fabric cover 13. The fabric material 17 is positioned across the male mold 18 and assembled therewith in all respects as was described in connection with FIG. 4.

On the closing of the molds 18 and 19, plastic is injected into the mold cavity 20 at the gate opening 35 to form the base structure 11, in all respects the same as was described with respect to FIG. 5, concurrently with a compression of the pad 12 between the molds 18 and 19 and the bonding of the peripheral portion 36 of the fabric cover 13 to the outer surface 37 of the frame member 14. On removal of the molded article from the mold unit the pad 12 expands to fill out the fabric cover 13 after which the fabric material 17 and the fabric cover 13 are trimmed at the junction 31 to complete the forming of the seat unit 10. With the fabric material 17 open to the atmosphere, the pad 12 is free to breathe.

It is seen, therefore, that the lateral resilience of the stretched fabric 17 enhances the feel and firmness of the pad 12 over a prolonged service life. It is to be further noted that the frame structure 14 is reinforced by the fabric material 17 while the strength of the bonded fabric material is increased relative to its strength when secured to a supporting member by staples or the like. Inexpensive fabrics and plastics can thus be used to complement their inherent and original strength characteristics to provide for the economic manufacture of the base structure 11 and the overall seat unit 10.

Although the invention has been described with respect to a preferred embodiment thereof, it is to be understood that it is not to be so limited since changes and modifications can be made therein which are within the full intended scope of this invention as defined by the appended claims.

I claim:

1. The method of molding a composite article having a stretchable fabric material stretched in tension across a central opening defined by a continuous plastic frame structure, the method comprising the steps of:
    (a) providing a male mold and a female mold which on being clamped together form a mold cavity for the frame structure,
    (b) supporting the fabric material across the open side of the male mold,
    (c) clamping the two molds together so that the female mold engages and stretches the fabric material in tension of the male mold concurrently with locating the perimetral portion of the fabric material within the mold cavity,
    (d) injecting a plastic material into the mold cavity in bonding securement with the perimetral portion of the fabric material, and then
    (e) removing the article from the mold, with the bonding of the fabric perimetral portion with the frame structure maintaining the fabric material in tension across said central opening.

2. The method of molding a composite article according to claim 1, including the steps of:
    (a) applying an initial tension to the fabric material when supported across the open side of the male mold, and applying a final tension when the two molds are clamped together.

3. The method of molding a composite article according to claim 1, wherein:
    (a) the perimetral portion of the fabric material, on clamping the two molds together, is extended diagonally transversely across the mold cavity to reinforce the strength characteristics of the frame structure.

4. The method of molding a composite article according to claim 2, wherein:
    (a) the fabric material under said final tension lies in a plane common to one side of the frame structure in the removed article.

5. The method of molding a composite article according to claim 4, wherein:
    (a) the frame structure is in a bonding relation with said perimetral portion of the fabric material to rigidly secure said perimetral portion to said frame structure when the fabric material is flexed laterally of said common plane.

6. The method of molding a composite article having a stretchable fabric material stretched in tension across a central opening defined by a continuous plastic frame structure and a resilient pad member supported on said fabric material having a fabric cover, said method comprising the steps of:
    (a) providing a male mold and a female mold which, on being clamped together, form a mold cavity for the frame structure,
    (b) supporting the fabric material across the open side of the male member
    (c) providing a recess in the female mold for the pad member and fabric cover,
    (d) positioning the fabric cover and the pad member in a back-to-back relation in the recess of the female mold,
    (e) clamping the two molds together so that the female mold engages and stretches the fabric material in tension on the male mold and locates the perimetral portion of the fabric material within the mold cavity concurrently with compressing the pad member in the recess and placing the perimetral portion of the fabric cover within and against the outer perimetral side surface of the cavity.
    (f) injecting a plastic material into the mold cavity in bonding securement with the perimetral portion of the stretchable fabric material and the perimetral portion of the fabric cover, and then
    (g) removing the article from the mold.

7. The method of molding a composite article according to claim 6 including the steps of:

(a) applying an initial tension to the fabric material when supported across the open side of the male mold, and applying a final tension when the two molds are clamped together.

8. The method of molding a composite article according to claim 7 wherein:
(a) the fabric material under said final tension lies in a plane common to one side of the frame structure.

9. The method of molding a composite article according to claim 8 where:
(a) the frame structure is in a bonding relation with the perimetral portion of the fabric material to maintain the perimetral portion rigidly secured to said frame structure when the fabric material is flexed laterally of said common plane.

10. The method of molding a composite article according to claim 8 wherein:
(a) the perimetral portion of the fabric cover is in bonded securement with the outer perimetral surface of the frame structure to confine the pad member between the fabric cover and the stretchable fabric material.

* * * * *